United States Patent
Robinson et al.

(10) Patent No.: US 7,082,415 B1
(45) Date of Patent: Jul. 25, 2006

(54) SYSTEM AND METHOD FOR BIOMETRICALLY-INITIATED REFUND TRANSACTIONS

(75) Inventors: Timothy L. Robinson, Reston, VA (US); Bradford R. Schildt, Boulder, CO (US); Tennille V. Goff, Springfield, VA (US); Daniel J. Corwin, Ashburn, VA (US)

(73) Assignee: BioPay, LLC, Herndon, VA (US)

( * ) Notice: Subject to any disclaimer, the term of this patent is extended or adjusted under 35 U.S.C. 154(b) by 0 days.

(21) Appl. No.: 10/829,448

(22) Filed: Apr. 22, 2004

Related U.S. Application Data

(63) Continuation-in-part of application No. 10/251,305, filed on Sep. 20, 2002.

(60) Provisional application No. 60/324,229, filed on Sep. 21, 2001.

(51) Int. Cl.
*G06F 17/00* (2006.01)

(52) U.S. Cl. .......................................... 705/67; 713/180

(58) Field of Classification Search .................. 705/67, 705/72; 713/186
See application file for complete search history.

(56) References Cited

U.S. PATENT DOCUMENTS

| | | |
|---|---|---|
| 4,230,214 A | 10/1980 | Cortez |
| 4,359,631 A | 11/1982 | Lockwood et al. |
| 4,553,222 A | 11/1985 | Kurland et al. |
| 4,716,593 A | 12/1987 | Hirai et al. |
| 4,879,747 A | 11/1989 | Leighton et al. |
| 4,915,205 A | 4/1990 | Reid et al. |
| 4,995,081 A | 2/1991 | Leighton et al. |
| 5,042,073 A | 8/1991 | Collot et al. |
| 5,086,389 A | 2/1992 | Hassett et al. |
| 5,144,553 A | 9/1992 | Hassett et al. |
| 5,274,695 A | 12/1993 | Green |
| 5,280,527 A | 1/1994 | Gullman et al. |
| 5,289,183 A | 2/1994 | Hassett et al. |
| 5,335,288 A | 8/1994 | Faulkner |
| 5,351,187 A | 9/1994 | Hassett |
| 5,352,876 A | 10/1994 | Watanabe et al. |
| 5,386,104 A | 1/1995 | Sime |
| 5,412,738 A | 5/1995 | Brunelli et al. |
| 5,450,980 A | 9/1995 | Laidlaw |
| 5,453,601 A | 9/1995 | Rosen |
| 5,455,407 A | 10/1995 | Rosen |

(Continued)

FOREIGN PATENT DOCUMENTS

EP 0598469 A2 5/1994

(Continued)

OTHER PUBLICATIONS

IMB Technical Disclosure Bulletin, Title: selective receipt of document elements in an electronic mail system, Issue No. 429, TDB-ACC-NO: NNRD429177, Jan. 2000, UK.*

(Continued)

*Primary Examiner*—Elisca Pierre Eddy
(74) *Attorney, Agent, or Firm*—Duane S. Kobayashi

(57) ABSTRACT

The present invention is a system and method of conducting refund transactions via electronic transaction records. System user transaction information entered into the system is stored in association with user biometric information. Transaction information is retrieved via user biometric recognition/verification for conducting refund transactions.

47 Claims, 3 Drawing Sheets

U.S. PATENT DOCUMENTS

| | | |
|---|---|---|
| 5,483,601 A | 1/1996 | Faulkner |
| 5,485,510 A | 1/1996 | Colbert |
| 5,523,551 A | 6/1996 | Scott |
| 5,546,523 A | 8/1996 | Gatto |
| 5,581,630 A | 12/1996 | Bonneau, Jr. |
| 5,594,806 A | 1/1997 | Colbert |
| 5,598,474 A | 1/1997 | Johnson |
| 5,602,933 A | 2/1997 | Blackwell et al. |
| 5,613,012 A | 3/1997 | Hoffman et al. |
| 5,615,217 A | 3/1997 | Horne et al. |
| 5,615,277 A | 3/1997 | Hoffman |
| 5,657,389 A | 8/1997 | Houvener |
| 5,679,938 A | 10/1997 | Templeton et al. |
| 5,688,974 A | 11/1997 | Devine et al. |
| 5,696,739 A | 12/1997 | Chang |
| 5,719,950 A | 2/1998 | Osten et al. |
| 5,722,526 A | 3/1998 | Sharrard |
| 5,737,439 A | 4/1998 | Lapsley et al. |
| 5,745,598 A | 4/1998 | Shaw et al. |
| 5,751,973 A | 5/1998 | Hassett |
| 5,764,789 A | 6/1998 | Pare, Jr. et al. |
| 5,790,674 A | 8/1998 | Houvener et al. |
| 5,790,785 A | 8/1998 | Klug et al. |
| 5,799,092 A | 8/1998 | Kristol et al. |
| 5,802,199 A | 9/1998 | Pare, Jr. et al. |
| 5,805,082 A | 9/1998 | Hassett |
| 5,805,719 A | 9/1998 | Pare, Jr. et al. |
| 5,832,464 A | 11/1998 | Houvener et al. |
| 5,838,812 A | 11/1998 | Pare, Jr. et al. |
| 5,845,256 A | 12/1998 | Pescitelli et al. |
| 5,850,442 A | 12/1998 | Muftic |
| 5,857,079 A | 1/1999 | Claus et al. |
| 5,864,623 A | 1/1999 | Messina et al. |
| 5,870,723 A | 2/1999 | Pare, Jr. et al. |
| 5,872,834 A | 2/1999 | Teitelbaum |
| 5,893,075 A | 4/1999 | Plainfield et al. |
| 5,897,616 A | 4/1999 | Kanevsky et al. |
| 5,914,472 A | 6/1999 | Foladare et al. |
| 5,927,544 A | 7/1999 | Kanoh et al. |
| 5,930,804 A | 7/1999 | Yu et al. |
| 5,933,816 A | 8/1999 | Zeanah et al. |
| 5,943,423 A | 8/1999 | Muftic |
| 5,982,914 A | 11/1999 | Lee et al. |
| 5,984,366 A | 11/1999 | Priddy |
| 6,009,411 A | 12/1999 | Kepecs |
| 6,012,039 A | 1/2000 | Hoffman et al. |
| 6,028,950 A | 2/2000 | Merjanian |
| 6,040,783 A | 3/2000 | Houvener et al. |
| D425,800 S | 5/2000 | Shin |
| 6,061,660 A | 5/2000 | Eggleston et al. |
| 6,070,141 A | 5/2000 | Houvener et al. |
| 6,070,147 A | 5/2000 | Harms et al. |
| 6,092,192 A | 7/2000 | Kanevsky et al. |
| 6,094,632 A | 7/2000 | Hattori |
| 6,105,010 A | 8/2000 | Musgrave |
| 6,119,932 A | 9/2000 | Maloney et al. |
| 6,148,091 A | 11/2000 | DiMaria |
| 6,149,055 A | 11/2000 | Gatto |
| 6,154,879 A | 11/2000 | Pare, Jr. et al. |
| 6,157,314 A | 12/2000 | Loftus |
| 6,161,059 A | 12/2000 | Tedesco et al. |
| 6,161,090 A | 12/2000 | Kanevsky et al. |
| 6,175,922 B1 * | 1/2001 | Wang .................. 713/182 |
| 6,181,807 B1 | 1/2001 | Setlak et al. |
| 6,192,142 B1 | 2/2001 | Pare, Jr. et al. |
| 6,196,460 B1 | 3/2001 | Shin |
| 6,222,914 B1 | 4/2001 | McMullin |
| 6,230,148 B1 | 5/2001 | Pare, Jr. et al. |
| 6,233,564 B1 | 5/2001 | Schulze, Jr. |
| 6,246,751 B1 | 6/2001 | Bergl et al. |
| 6,269,348 B1 | 7/2001 | Pare, Jr. et al. |
| 6,282,658 B1 | 8/2001 | French et al. |
| 6,307,955 B1 * | 10/2001 | Zank et al. .................. 382/121 |
| 6,307,956 B1 | 10/2001 | Black |
| 6,310,966 B1 | 10/2001 | Dulude et al. |
| 6,314,169 B1 | 11/2001 | Schelberg, Jr. et al. |
| 6,317,723 B1 | 11/2001 | Walker et al. |
| 6,317,834 B1 | 11/2001 | Gennaro et al. |
| 6,321,339 B1 | 11/2001 | French et al. |
| 6,327,573 B1 | 12/2001 | Walker et al. |
| 6,330,543 B1 | 12/2001 | Kepecs |
| 6,332,134 B1 | 12/2001 | Foster |
| 6,334,109 B1 | 12/2001 | Kanevsky et al. |
| 6,334,112 B1 | 12/2001 | Walker et al. |
| 6,334,113 B1 | 12/2001 | Walker et al. |
| 6,341,169 B1 | 1/2002 | Cadorette, Jr. et al. |
| 6,345,263 B1 | 2/2002 | Matsumoto et al. |
| 6,363,485 B1 * | 3/2002 | Adams et al. ............... 713/186 |
| 6,366,682 B1 | 4/2002 | Hoffman et al. |
| 6,370,649 B1 | 4/2002 | Angelo et al. |
| 6,381,344 B1 | 4/2002 | Smithies et al. |
| 6,389,401 B1 | 5/2002 | Kepecs |
| 6,397,126 B1 | 5/2002 | Nelson |
| 6,397,198 B1 | 5/2002 | Hoffman et al. |
| 6,405,125 B1 | 6/2002 | Ayed |
| 6,415,262 B1 | 7/2002 | Walker et al. |
| 6,422,464 B1 | 7/2002 | Terranova |
| 6,424,249 B1 | 7/2002 | Houvener |
| 6,433,818 B1 | 8/2002 | Steinberg et al. |
| 6,446,044 B1 | 9/2002 | Luth et al. |
| 6,463,127 B1 | 10/2002 | Maier et al. |
| 6,466,917 B1 | 10/2002 | Goyal et al. |
| 6,470,233 B1 | 10/2002 | Johnson, Jr. |
| 6,470,322 B1 | 10/2002 | Walker et al. |
| 6,477,509 B1 | 11/2002 | Hammons et al. |
| 6,496,595 B1 | 12/2002 | Pucheck et al. |
| 6,497,360 B1 | 12/2002 | Schulze |
| 6,498,970 B1 | 12/2002 | Colmenarez et al. |
| 6,507,912 B1 | 1/2003 | Matyas, Jr. et al. |
| 6,522,772 B1 | 2/2003 | Morrison et al. |
| 6,523,741 B1 | 2/2003 | DiMaria et al. |
| 6,529,871 B1 | 3/2003 | Kanevsky et al. |
| 6,529,878 B1 | 3/2003 | De Rafael et al. |
| 6,532,459 B1 | 3/2003 | Berson |
| 6,539,282 B1 | 3/2003 | Metcalf et al. |
| 6,542,874 B1 | 4/2003 | Walker et al. |
| 6,554,705 B1 | 4/2003 | Cumbers |
| 6,559,776 B1 | 5/2003 | Katz |
| 6,567,787 B1 * | 5/2003 | Walker et al. ................. 705/16 |
| 6,581,042 B1 | 6/2003 | Pare et al. |
| 6,591,224 B1 | 7/2003 | Sullivan et al. |
| 6,594,376 B1 | 7/2003 | Hoffman et al. |
| 6,636,973 B1 | 10/2003 | Novoa et al. |
| 6,646,568 B1 | 11/2003 | MacPhail et al. |
| 6,647,372 B1 | 11/2003 | Brady et al. |
| 6,650,999 B1 | 11/2003 | Brust et al. |
| 6,651,063 B1 | 11/2003 | Vorobiev |
| 6,653,946 B1 | 11/2003 | Hassett |
| 6,655,585 B1 | 12/2003 | Shinn |
| 6,662,166 B1 | 12/2003 | Pare et al. |
| 6,685,088 B1 | 2/2004 | Royer et al. |
| 6,694,300 B1 | 2/2004 | Walker et al. |
| 6,695,206 B1 | 2/2004 | Ross |
| 6,715,673 B1 | 4/2004 | Fulcher et al. |
| 6,715,674 B1 | 4/2004 | Schneider et al. |
| 6,748,365 B1 | 6/2004 | Quinlan et al. |
| 6,755,344 B1 | 6/2004 | Mollett et al. |
| 6,792,334 B1 | 9/2004 | Metcalf et al. |
| 6,792,422 B1 | 9/2004 | Stride et al. |
| 6,796,492 B1 | 9/2004 | Gatto |
| 6,796,499 B1 | 9/2004 | Wang |
| 6,827,260 B1 | 12/2004 | Stoutenburg et al. |
| 6,854,642 B1 | 2/2005 | Metcalf et al. |
| 6,865,544 B1 | 3/2005 | Austin |

| | | |
|---|---|---|
| 6,873,969 B1 | 3/2005 | Stone et al. |
| 6,886,742 B1 | 5/2005 | Stoutenburg et al. |
| 6,935,559 B1 | 8/2005 | Mollett et al. |
| 2001/0000535 A1 | 4/2001 | Lapsley et al. |
| 2001/0011680 A1 | 8/2001 | Soltesz |
| 2001/0025245 A1 | 9/2001 | Flickinger et al. |
| 2001/0034609 A1 | 10/2001 | Dovolis |
| 2001/0042022 A1 | 11/2001 | Kirkpatrick et al. |
| 2001/0047223 A1 | 11/2001 | Metcalf et al. |
| 2001/0047343 A1 | 11/2001 | Dahan et al. |
| 2002/0019811 A1 | 2/2002 | Lapsley et al. |
| 2002/0029196 A1 | 3/2002 | Metcalf et al. |
| 2002/0038165 A1 | 3/2002 | McHale, IV et al. |
| 2002/0046121 A1 | 4/2002 | Walker et al. |
| 2002/0062249 A1 | 5/2002 | Iannacci |
| 2002/0077889 A1 | 6/2002 | Kolls |
| 2002/0077890 A1 | 6/2002 | LaPointe et al. |
| 2002/0077902 A1 | 6/2002 | Marcus |
| 2002/0087413 A1 | 7/2002 | Mahaffy et al. |
| 2002/0091537 A1 | 7/2002 | Algazi |
| 2002/0094111 A1 | 7/2002 | Pucheck et al. |
| 2002/0111917 A1 | 8/2002 | Hoffman et al. |
| 2002/0112177 A1 | 8/2002 | Voltmer et al. |
| 2002/0116266 A1 | 8/2002 | Marshall |
| 2002/0128851 A1 | 9/2002 | Chefalas et al. |
| 2002/0148892 A1 | 10/2002 | Bardwell |
| 2002/0153414 A1 | 10/2002 | Stoutenburg et al. |
| 2002/0161629 A1 | 10/2002 | Jentoft |
| 2002/0162031 A1 | 10/2002 | Levin et al. |
| 2002/0173986 A1 | 11/2002 | Lehew et al. |
| 2002/0178063 A1 | 11/2002 | Gravelle et al. |
| 2002/0194128 A1 | 12/2002 | Martizen et al. |
| 2002/0196963 A1 | 12/2002 | Bardwell |
| 2003/0006277 A1 | 1/2003 | Maskatiya et al. |
| 2003/0009382 A1 | 1/2003 | D'Arbeloff et al. |
| 2003/0009393 A1 | 1/2003 | Norris |
| 2003/0018522 A1 | 1/2003 | Denimarck et al. |
| 2003/0018567 A1 | 1/2003 | Flitcroft et al. |
| 2003/0034876 A1 | 2/2003 | Pucheck et al. |
| 2003/0046228 A1 | 3/2003 | Berney |
| 2003/0055727 A1 | 3/2003 | Walker et al. |
| 2003/0067396 A1 | 4/2003 | Hassett |
| 2003/0075287 A1 | 4/2003 | Weik |
| 2003/0076417 A1 | 4/2003 | Thomas et al. |
| 2003/0090473 A1 | 5/2003 | Joshi |
| 2003/0105725 A1 | 6/2003 | Hoffman |
| 2003/0144956 A1 | 7/2003 | Yu et al. |
| 2003/0150907 A1 | 8/2003 | Metcalf et al. |
| 2003/0183689 A1 | 10/2003 | Swift et al. |
| 2003/0187790 A1 | 10/2003 | Swift et al. |
| 2003/0187796 A1 | 10/2003 | Swift et al. |
| 2003/0191709 A1 | 10/2003 | Elston et al. |
| 2003/0209599 A1 | 11/2003 | Gatto |
| 2003/0216967 A1 | 11/2003 | Williams |
| 2003/0216987 A1 | 11/2003 | Mollett et al. |
| 2003/0222135 A1 | 12/2003 | Stoutenburg et al. |
| 2003/0229539 A1 | 12/2003 | Algiene |
| 2003/0229540 A1 | 12/2003 | Algiene |
| 2003/0229790 A1 | 12/2003 | Russell |
| 2003/0236704 A1 | 12/2003 | Antonucci |
| 2004/0012481 A1 | 1/2004 | Brusseaux |
| 2004/0020982 A1 | 2/2004 | Hoffman et al. |
| 2004/0024672 A1 | 2/2004 | Brack et al. |
| 2004/0039632 A1 | 2/2004 | Han et al. |
| 2004/0054587 A1 | 3/2004 | Dev et al. |
| 2004/0083172 A1 | 4/2004 | Wiederin |
| 2004/0088232 A1 | 5/2004 | Minnis, Jr. |
| 2004/0088295 A1 | 5/2004 | Glazer et al. |
| 2004/0143505 A1 | 7/2004 | Kovach |
| 2004/0155101 A1 | 8/2004 | Royer et al. |
| 2004/0158524 A1 | 8/2004 | Anderson et al. |
| 2004/0192434 A1 | 9/2004 | Walker et al. |
| 2004/0201520 A1 | 10/2004 | Flick |
| 2004/0215565 A1 | 10/2004 | Huffman |
| 2004/0254026 A1 | 12/2004 | Slemmer et al. |
| 2005/0010478 A1 | 1/2005 | Gravelle |
| 2005/0055582 A1 | 3/2005 | Bazakos et al. |
| 2005/0144133 A1 | 6/2005 | Hoffman et al. |

FOREIGN PATENT DOCUMENTS

| | | |
|---|---|---|
| EP | 0762261 A2 | 3/1997 |
| JP | 358044583 A * | 3/1983 |

OTHER PUBLICATIONS

S. Davies. Touching Big Brother. How Biometric Technology Will Fuse Flesh and Machine. Inforamtion Technology & People.vol. 7 (4) 1994.

Lawrence Aragon. Show me some ID. PC Week Online (http://www.zdnet.com/pcweek/0112/12bio.html) Jan. 1998.

Gerald Lazar. Agencies Scan Biometrics for Potential Applications. FCW.com (http://www.few.com.pubs.few.1997/0120/feature.htm) Jan. 1997.

Comparison of Biometric Identification Methods. http://www.and.nl/id/gen_biom.html. Dec. 1998.

The Speech Recognition API (SRAPI) Committee Announces Support for Speaker Verification. http:/www.srapi.com/svapipr.html. Oct. 1996.

New Technology Enables Computers to Identify, Verify User Voices. http://www.srapi.com/savpi/pr041597.html. Apr. 1997.

Accounting 5544. Biometric Technology. http://acctserver.cob.vt.edu/faculty.jhicks/acct5544/present/ddeverea.htm. Apr. 1997.

Vault FAQs. http://www.ImagineNation.com/Xanadu/Vault. Jun. 1997.

John Daugman. The Scientific Basis for Iris Recognition. Http://www.iriscan.com/basis.htm. Dec. 1998.

Electronic Banking 1. http://www.sjb.co.uk/eb1.html. Aug. 1998.

Biometric Technology Today (Btt). vol. 6(5) Sep. 1998.

Biometric Digest. Mar. 1998.

Biometrics in Human Services. vol. 2(1) Feb. 1998.

"The Biometric Bar Tab Project." http://www.csee.wvu.edu/~wise/biometric/index.htm, including Dec. 9, 2002 Proposal and May 5, 2003 Team Report.

Office of NYS Attorney General Eliot Spitzer. Financial Giant Joins Fight Against Online Gambling. Press Release. http://www.oag.state.ny.us/press/2002/jun/jun14a_02.html. Jun. 2002.

Zions Bank. Cards for Any Business Occasion. http://www.zionsbank.com/bank_cards,jsp?leftNav=bf_bfinance &topNav=bfinance.

ABSA. Purchasing Credit Card. http://www.absa.co.za/Corporate/0,2999,2210,00.html.

Visa U.S.A. Visa Purchasing. http://www.usa.visa.com/corporate/corporate_solutions/payment/visa_purchasing.html?it=cl/corporate/corporate_solutions/index%2Ehtml|Visa%20Purchasing%20.

University of Wisconsin-Green Bay. Purchasing Department: Purchasing Card. http://www.uwgb.edu/Purchasing/purchasingCard/procurement07.htm.

Reference Guides Glossary Terms (Online Glossary Terms and Definitions). Merchant Category Code (MCC) (Merchant Category Code) (MCC) Help). http://glossary.reference-quides.com/Merchant/Merchant_Category_Code_MCC/. 2003.

University of Denver. Purchasing Card User Guide. http://www.du.edu/purchasing/purcard.html#2.%20HOW%20DOES%20THE%20CARD%20WORK?.

Williams College Controller's Office. Purchasing Card Procedures. http://www.williams.edu/admin/controller/pcard.html#whatis. Jan. 2005.

Arizona State University. The Purchasing Card: A Guide for Users. http://www.asu.edu/purchasing/pdf/purchcard.pdf. Jan. 2005.

Video Insight http://www.video-insight.com/dvr221.htm.

TMCnet. Cemium Installs Perceptrak Behavrior Recognition Software In Public Parking Garage In Yonkers. http://www.tmcnet.com/usubmit/2003/Dec/1021669.htm. Dec. 2003.

City of Aspen. Parking. http://www.aspenpitkin.com/depts/61/payanddisplay.cfm.

SmartCity. SmartCity Card Solutions. http://www.coinamatic.com/coinamatic_group/html/apartment_laundry_services/smartcity/Products/p4.html.

TranCore. TransCore Access Control System First to Successfully Combine Biometrics and RFID. http://www.transcore.com/news/news050314.htm. Mar. 2005.

Washington Post—For Dining In, Security Is the Order of the Day; Post 9/11 Concerns Thawarting Deliverymen: [Final Edition], 2004.

MophoTouch™—Multi-Application Finger Identification in the Palm of Your Hand, Sagem Morpho, Inc., 1999.

James P. Holmes et al. A Performance Evaluation of Biometric Identification Devices. Sandia Report. Jun. 1991.

* cited by examiner

SYSTEM AND METHOD FOR BIOMETRICALLY-INITIATED REFUND TRANSACTIONS

This application is a continuation-in-part of application Ser. No. 10/251,305, filed Sep. 20, 2002, which claims domestic priority from provisional application No. 60/324,229, filed Sep. 21, 2001. Each above-identified application is incorporated by reference herein, in its entirety, for all purposes.

FIELD OF THE INVENTION

This application relates generally to a system and method of conducting biometrically-initiated refund transactions. More particularly, the present invention relates to a system and method for allowing individuals to store and retrieve transaction information by means of biometric association.

BACKGROUND OF THE INVENTION

Generally, an individual conducting a purchase transaction receives a paper record that displays information about the transaction, such as the date of the transaction, the location of the transaction, items/services purchased in the transaction, and how the individual paid for the purchase. Should the individual wish to return a purchased item/service from that transaction for money, the individual must typically present the paper record they received of the transaction for the purposes of providing proof of the transaction, and/or necessary return details of the transaction. Requiring a customer to keep track of these paper records and present them in a refund transaction poses a nuisance to the customer that might discourage the customer from seeking a refund if they cannot find the proper paperwork.

Since retail stores are not required by law to provide customers with refund services, they may set their own refund policies. Because fraudulent refund transactions can pose a large area of risk, merchants typically enforce refund policies that help minimize these loss risks but still enable customers to return unwanted and/or defective merchandise. For example, such policies typically include requiring customers to present physical receipts for full refunds and to return purchased items within a set timeframe. Additionally, merchants often require customers conducting refund transactions to provide personal information, such as their home address, telephone number, and email address. Although paper receipts provide customers the benefit of allowing them to conduct full refunds, keeping track of these receipts is cumbersome for customers, forcing them to keep a backlog of paperwork on their purchases and then forcing them to find a receipt in that backlog every time they want to return an item/service. In addition, requiring customers to provide personal information is not only an inconvenience to customers but also an invasion of privacy. What is needed are better systems and methods for providing customers and merchants with records of purchase transactions.

SUMMARY OF THE INVENTION

The present invention addresses the aforementioned needs by providing customers and merchants with a more accessible system and less cumbersome method of recording and accessing transaction information, wherein transaction information is stored in electronic transaction records that are accessed and updated via biometric recognition and/or verification. A process by which customer biometric information is associated with electronically captured transaction information allows customers and merchants to perform more secure, convenient, and efficient refund transactions. Additionally, a process by which customers verify their identity as purchaser or their affiliation with the purchaser of a refund transaction, offers merchants a more secure method of conducting refund transactions.

DETAILED DESCRIPTION OF THE INVENTION

Figure 1:
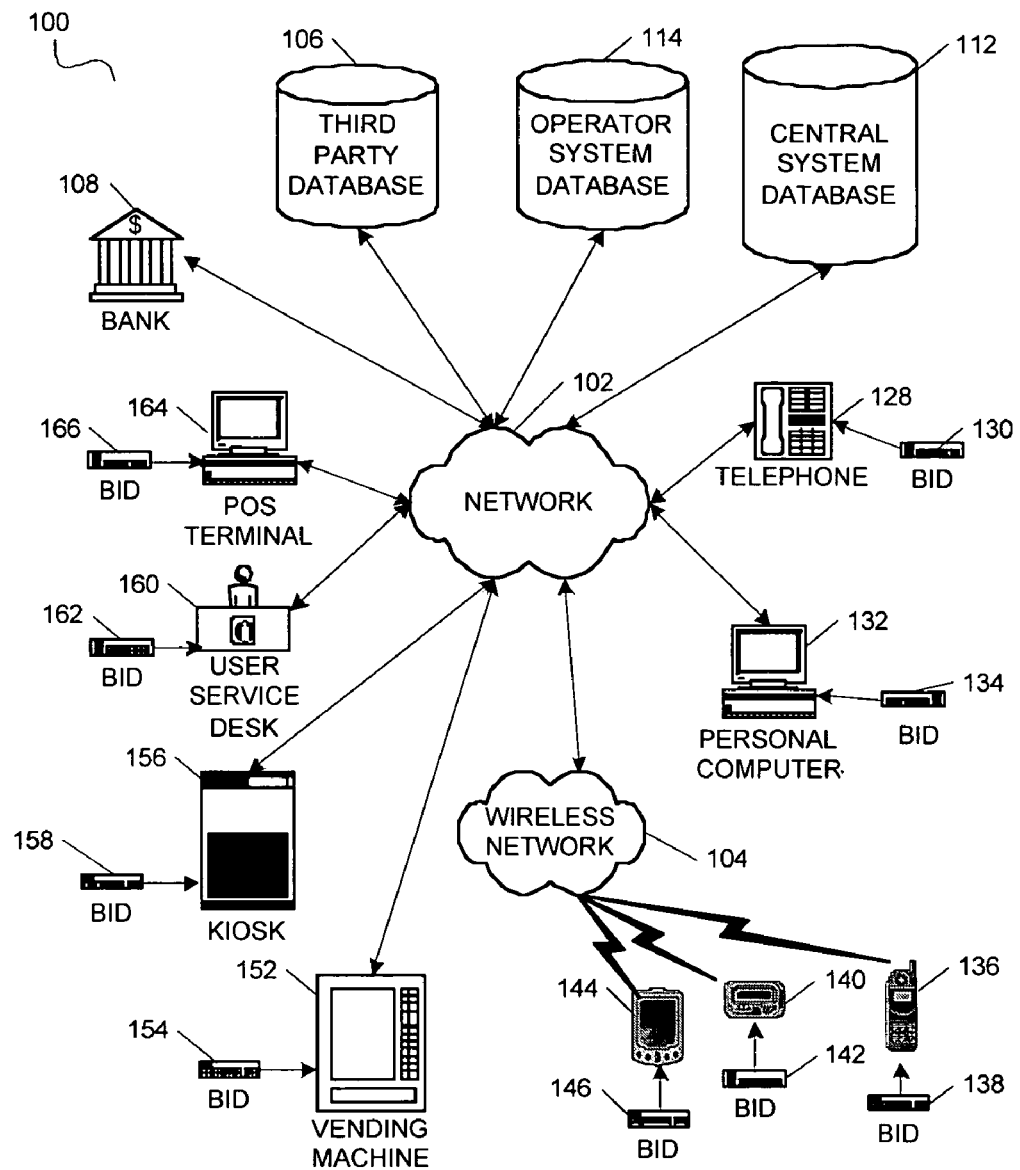
FIG. 1 illustrates an overview of the general architecture of a system for biometric authorization for refund transactions according to an embodiment of the present invention.

Additional objects and advantages of the present invention will be apparent in the following detailed description read in conjunction with the accompanying drawing figures.

As previously noted, the present invention encompasses a system and method for conducting refund transactions via biometrically-initiated access of electronic transaction records.

User transaction information is stored as one or more electronic records that are associated with a user's biometric sample. Transaction information may be stored as an electronic record during or after a transaction takes place. Additionally, transaction information may be converted from physical form, e.g. a paper receipt, to electronic form at a system device, or may be pulled from one or more storage locations to a system database. Regardless of how transaction information is entered into the system, it is stored in electronic form and in association with a user biometric sample. Depending on the embodiment of the system, stored transaction information may be organized according to varying forms. By way of illustration but without limitation, transaction information may be grouped by transaction, by an item/service identification code, by an item/service related department, by price, by merchant, by merchant location, and/or by item/service description.

Storing transaction information in electronic form and in association with a user biometric sample allows a user to conduct refund transactions based upon the stored transaction information simply by presenting a biometric. Because most merchants currently require individuals to present a physical transaction receipt in a cash-back refund transaction, the present invention will provide users with a more convenient method of presenting those transaction records, by presenting their electronic transaction records in lieu of traditional physical receipts. The current invention also provides customers with greater privacy, allowing them to conduct return transactions without necessarily having to share their personal information with merchants with which they conduct return transactions. Additionally, the invention will provide merchants with a more secure form of conducting refund transactions by associating customer biometric information with a transaction. Allowing users to present electronic transaction records in a refund transaction eliminates the need for users to keep track of and present traditional physical transaction records, such as paper receipts, at the time of a refund transaction.

A user conducts transactions in the system by presenting a biometric sample that is compared to one or more registered biometric samples stored at the system database. Matching a user biometric sample to a registered biometric sample enables a user to retrieve information stored in association with the registered biometric and/or approval of a transaction request depending on the action the user requests in the system. There are two main types of biometric comparison systems: biometric verification systems, wherein the system performs a "one-to-one" comparison of an individual's biometric to a record of his biometric, and biometric recognition systems, wherein the system performs a "one-to-more than one" biometric comparison of an individual's biometric to his biometric record and at least one other biometric record. A "one-to-one" biometric comparison verifies the individual presenting the biometric is who he says he is, and a "one-to-more than one" biometric comparison recognizes an individual's biometric from a group of two or more biometrics. For the purposes of this application, "biometric system" is intended to refer to both verification and recognition biometric systems. As would be appreciated, the invention methods and their related methods of biometric comparison disclosed herein should not be used to limit the scope of the invention. The scope of the invention should allow for varying combinations of methods and their related methods of biometric comparison.

Additionally, this invention is not limited to using one form of biometric. For example, the biometric samples referred to throughout this description might refer to an image of a biometric and/or a mathematical representation of the biometric sample, often referred to as a "template" in terms of biometric applications.

FIG. 1 illustrates a general architecture overview of a biometrically-initiated refund system 100 that is based on biometric recognition and/or verification. As will be described in greater detail below, refund system 100 enables a receiptless refund transaction by which users are encouraged to associate their biometric information with their purchase transaction information. Transaction information is stored in at least one system database 112, 114 where system user records are stored. In one embodiment, the system database is a central database to which all system user records are stored and from which informational system user records are accessed for identity verification/recognition. In another embodiment, the system database is one or more operator databases 114 to which a select set of user records are stored and from which a select set of user records are accessed for identity verification/recognition. In an additional embodiment, refund system 100 may also utilize a combination of central databases 112 and one or more operator databases 114. In general, embodiments utilizing a combination of system databases 112, 114 enable increased control of information flow throughout the refund system 100. As described in greater detail below, various examples of information flow configurations within the system can include "open," "closed," and "selectively shared" system models. In still further embodiments, system database 112, 114 can further comprise one or more sub databases that are contained within a particular system database 112, 114. In such embodiments, system user data, system operator data, and other system data may be distributed across multiple databases within the system database.

A system user record holds system user biometric information and other identity verifying information related to an individual seeking biometric recognition/verification so that the system user may identify himself and associate his transaction information with his system record. The information held in such a record may include, by way of illustration and without limitation, a system user's government identification number(s) and corresponding state(s) of issue, home address, a telephone number, and at least one biometric record. A system user may present any number of identity verifying documents or testaments to his identity depending on the embodiment of the biometric system. By way of illustration and not of limitation, examples of such documents or testaments include a financial token, a digital image, a video clip, family information, or a DNA sample. Depending on the particular implementation, a system user record can also hold financial account information and/or a system identification number (SID). A SID is a code used in conjunction with a system user biometric sample for biometric recognition/verification.

The system also comprises system operator records which hold information useful for authenticating an operator, such as a name or ID number, device ID numbers associated with the operator, an address, and a phone number. In an alternate embodiment of the present invention, the operator records also hold employer information if the operator is an employee of an employer who is also an operator. In another embodiment of the present invention, operator records hold an operator SID and/or an operator biometric sample.

The system may be configured so that at least one system database 112, 114 is connected to at least one network 102, such as but not limited to, the Internet. This network comprises connections to at least one device where transaction information is entered. These devices include but are not limited to a vending machine 152, a kiosk 156, a personal computer 132, a user service desk 160, a point of sale (POS) terminal 164, or a wireless device 144, 140, and 136, connected via wireless network 104, with respective biometric input devices (BIDs) 130, 134, 138, 142, 146, 154, 158, 162 and 166. BID devices are illustrated in FIG. 1 as peripheral devices for purposes of emphasis only. The system should not be so limited and may certainly incorporate devices with built-in BIDs.

Networks used in additional embodiments include LANs (local area networks), WANs (wide area networks), and telephone networks. In such embodiments, system users communicate with at least one system database 112, 114 via telephone 128, with connected BID device 130.

Additional embodiments of the system also comprise connections to one or more third party sources, such as a third party database 106 and/or one or more financial institutions 108, in which system user-presented information is verified and/or from which system user information is pulled. Financial institution 108 may also allow users to conduct biometrically authorized financial transactions with the system should the system be so configured. For ease of integration of such methods, the method of conducting biometrically authorized financial transactions might be adapted so that it may be conducted concurrently with the method for biometrically initiated refund transactions and vice versa.

In one embodiment, the system is configured as an "open" system, meaning all information entered into the system is transmitted to and stored in a central system database 106. An open system allows system user transaction information to be stored and/or accessed via any device in the system because an open system shares system user information stored in the centralized system database 112 with all system devices. System user records in an open system may additionally be sub partitioned by system operator with which the user conducts transactions. This system embodiment allows user identity information to be shared across system operators freely but restricts access to operator-specific sub partitions within the user's record to the specific system operator and his associated system operators.

In an alternate embodiment, the system is configured as a "closed" system, meaning information entered into the system via a specific operator device is transmitted to and stored in a system database specific to that operator 114, and this information is not shared with devices other than those specific to the operator database 114 or other operator-specific databases. This is referred to as a "closed" system because system user information stored in one system operator's database 114 is unique to that user's interaction with that specific system operator and/or specific system operator device(s). System users must register their identifying information in the database of each additional system operator system wherein they would like to store electronic transaction information. Operator system databases 114 in closed systems may query other databases, such as a third party information database 106, for system user information verifications. However, all system user information that is enrolled into a particular operator system database 114 is stored in that database. In an alternate embodiment of the closed system, information pertaining to specific system operators is stored in a partitioned, central system database 112. System operator related information is stored in system, operator-specific partitions and is closed to all other system operators. Only the system operator and system operator employees may access that partition of the central system database 112. In yet an additional embodiment, system operator related information stored in an operator system database is additionally stored on the central system database 112 where their system users' records are stored. Such an embodiment is useful for information protection in the event database information is lost.

In a further embodiment of the present invention, system user information is "selectively shared" and stored in select system multiple-operator databases or select, system multiple-operator partitions within the central system database 112. In this embodiment, a group of system operators share data with each other and they choose whether or not to share system information with other system operators within the system. Such a system is referred to as a "selectively shared" system. This system allows a chain of system operators owned by the same entity or linked in some other manner to share system user information amongst them without sharing that information with all other non-designated system operators registered in the system. Information in such a system may be shared between one or more operator system databases 114 and the central system database 112 freely or sharing may be monitored by rules set in the operator system databases 114, the central system database 112, or both. By way of illustration and not as a limitation, one system operator might only want to share system user transaction information with one of five system operators in a multi-verifier system or all system operators might not want to send or store system user transaction information to the central system database 112. Such a system allows system operators greater control over information flow while still allowing various user conveniences, such as being able to return a product to any store in a selectively shared chain.

The configuration of the system as an "open" system, "closed" system, or "selectively shared" system illustrates various ways of implementing the principles of the present invention. System configuration might be determined by the system in which the electronic transaction information is used. For example, if the refund system is combined with a biometrically-authorized financial transaction system, a merchant who is an operator in the system and who allows customers to conduct biometrically-authorized financial transactions might have a system configured with his own operator system database 114 and one or two biometric authorization terminals, for example 164 and 160, connected to that database. In this system configuration, the merchant's database files only exist on his database 114 and are retrieved or accessed for biometric matching only by the one or two pre-determined stations 164 and 160 connected to the database 114; therefore, the system would be a "closed" system.

System users register for a biometrically-initiated refund transaction system by creating a user record with a system database. As would be appreciated, determining the data required to enable usage of the system would depend on the embodiment of the system. However, in a standard enrollment, a user presents at least one biometric sample. A user may additionally present other identity verifying information, such as his name, mailing address, phone number, driver's license number, and e-mail address. Depending on the system embodiment, the system may additionally require a user to register a system identification number (SID). In such an embodiment, a SID typically serves as a pointer that can be used with or without a user biometric sample to aid the system in locating the storage location of a user record. Depending on the embodiment of the system, a SID may also serve as a user group identifier that identifies a user as an affiliate of a specified group of users. In an additional embodiment, the system may perform a re-registration check on a user's information to ensure that the user is not already registered in the system.

Regardless of the information required for enrollment, users may enroll in the system in an enrollment transaction or may enroll in the system during another system transaction. For example, a user who wishes to enroll in the system presents his biometric information and any other requested identity information. That user's information is stored in a database, and the user is enrolled. The user may, alternatively, wish to enroll in the system during a purchase transaction. For example, a user purchasing a few items at an electronics store might decide that she would like to enroll in the system. If she chooses to enroll, she would then enter a biometric sample. She would additionally enter any other enrollment information that the system requests. The method of entering such information would be implementation dependent. For example, information could be hand-keyed, pulled from an electronic read of a token, and/or pulled from another information database, which may or may not be designated by the user. The current transaction information is then associated with the user biometric sample, both of which are stored in a system database as a user record. Thereafter, the user simply provides her biometric sample during a transaction and the transaction information is stored with the user's system record.

In an additional embodiment, the present invention is combined with a biometrically-authorized transaction system that requires a user to present his biometric during a transaction for identity verification, such as a biometrically-authorized financial transaction system, an age-restricted transaction system, or a rewards transaction system. The present invention used in combination with such a system would enable the transaction information to be stored in association with a user identity-verification record previously created for enrollment into the additional biometric system.

In yet another embodiment, a user wishing to convert pre-existing physical and/or electronic records of transaction information into the system may present these records at a system device. The system device would scan and/or read the records, retrieving them from transaction information to be stored in association with the user's system record. If a user is not enrolled in the system, he may still convert a pre-existing record of a transaction into the system in the process. He simply presents his biometric, the transaction information, and any other necessary enrollment information, and this information is sent to a system database for storage as a new user record.

Figure 2:
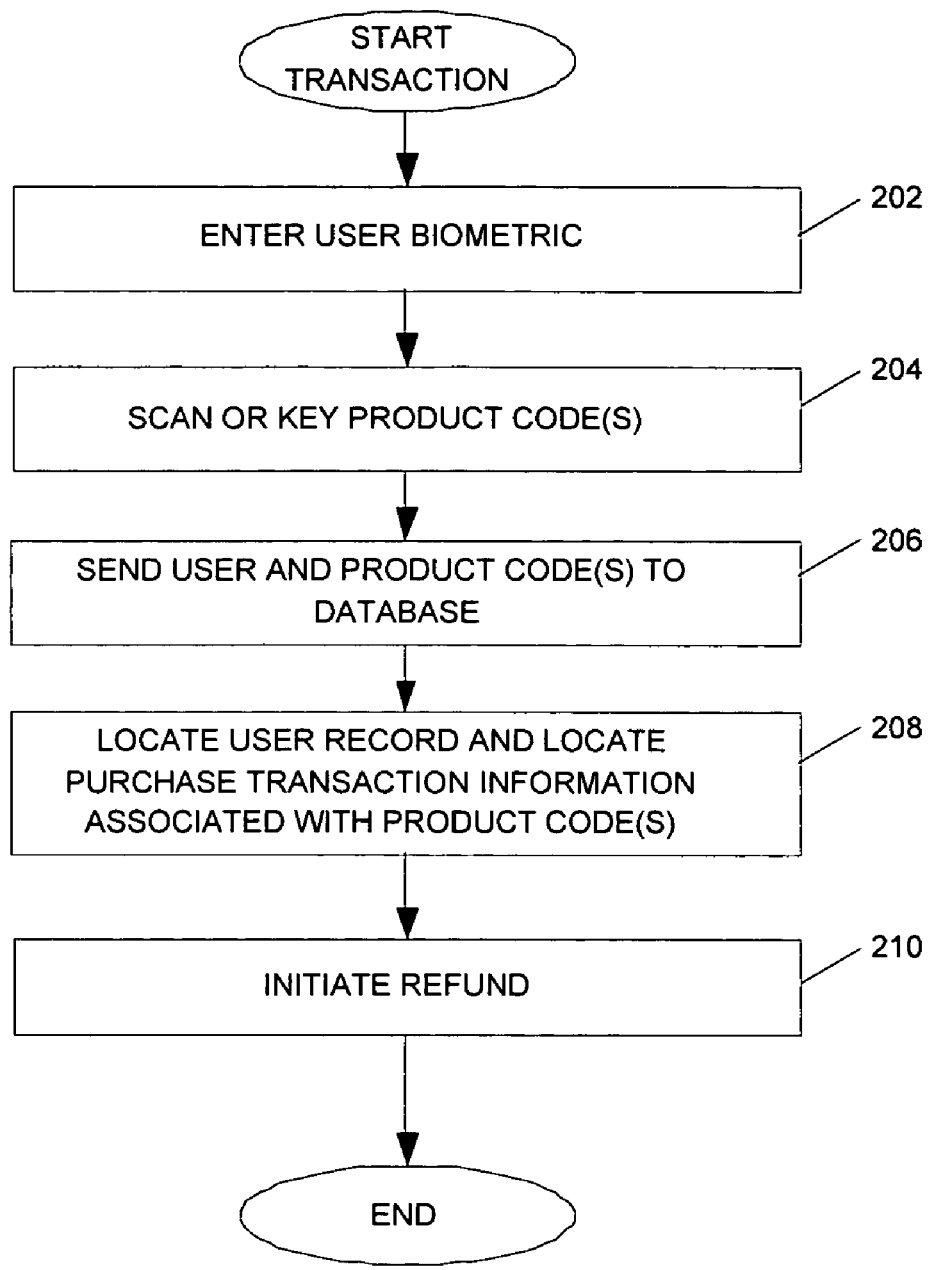
FIG. 2 illustrates a flowchart of a process for creating a biometrically associated, electronic transaction record.

FIG. 2 illustrates a method by which transaction information is entered into and stored in a system for creating electronic transaction records.

At step 202, information related to a transaction is entered into a transaction station. Transaction information may include but is not limited to, the date of a transaction, the time of a transaction, the location of a transaction, one or more items/services exchanged in a transaction, the quantity of one or more items/services exchanged in a transaction, the price of one or more items/services exchanged in a transaction, the method of payment in a transaction, and one or more system operator associated with a transaction. In an additional embodiment, the method of creating an electronic transaction record is appended to a method for biometrically authorizing a transaction. In systems wherein such methods are combined, transaction information may additionally include a transaction approval request that is evaluated and approved or denied concurrently with the method of storing the electronic transaction record.

At step 204, the transaction information and a user biometric sample is sent to a system database. The user biometric sample may be scanned into the transaction station at any time during the transaction. Additionally, if the current invention is appended to a biometrically authorized system and method, the biometric sample captured for use in authenticating the user to that authorization system may be also used in the method of the current invention. In an additional embodiment, the system is configured for biometric verification and might request a user additionally enter a system identification code (SID) that is also sent to the database. In a biometric verification embodiment, a SID may serve various purposes. For example, it can be used as added insurance that the user is properly identified within the system database, or it can serve as an affiliation code by which a group of users affiliate their electronic transaction records with each other in an effort to create a chain of possible users authorized to conduct refund transactions for their purchase transactions. Regardless of the purpose of the SID, such an embodiment of the system would help simplify and increase reliability of the system by increasing the probability that the user's electronic transaction record is stored in the proper user record. It is also possible at this point that the user enters a transaction code that indicates user-defined categories of transactions. For example, if the user is making a business purchase, he enters a code that indicates that the transaction is business related, or if the user is making a leisure purchase, he enters a code that indicates that the transaction is leisure related. Such codes might enable users to better organize their transaction records.

At step 206, the user record is located by matching the biometric sample to a biometric sample stored at the database. If the user entered a SID, a user record might first be located by the SID and the biometric sample verified with a registered biometric sample associated with the SID. At step 208, if the user record is located, the transaction information is stored in association with the system record. Alternatively, if no user record is found in the system one is created and the transaction information is stored in association with the newly formed record. Additionally, users who wish to receive a paper record of the transaction might select to receive one.

Depending on the embodiment of the invention, electronic records stored in association with user records might additionally be divided into sub records associated with one or more system operators. For example, in a financial transaction merchant information included in the transaction information might designate a specific sub record with which to associate the transaction record. Such an embodiment might allow for faster transaction information location during later user record accesses. Additionally, such an embodiment would serve closed or selectively shared system organizations by requiring merchant information to be matched before allowing access to the user sub record associated with that merchant. As users may affiliate their user records with other users, so may system operators affiliate their records in selectively shared systems. In such a system, a system operator identifier would provide that system operator access to his designated group of affiliated system operators within the system.

In an additional embodiment of the system, users may utilize a personal biometric device to aid storing transaction information in the system. Such an embodiment is conceived for transactions in which a merchant does not have a biometric device but has a device that can communicate with a user personal device, such as a personal data assistant 144 with BID 146, a pager 140 with BID 142, and/or cellular phone 136 with BID 138. In such transactions, transaction information is electronically communicated to the user personal device 144, 140, 142, into which the user presents his biometric sample via connected/integrated BID 146, 142, 136. This information is sent to the system database, where it is stored in association with the user record. Methods of communicated transaction information from the transaction terminal to a user personal device might include but should not be limited to infrared transmission and other forms of wireless communication.

The system might also allow users to create electronic transaction records after a transaction has taken place by converting conventional transaction receipts into electronic form and/or storing that new electronic form in association with a user biometric. This method might be useful to new system users who have kept a backlog of transaction receipts that they would like entered into the system. Additionally, this method might also be a useful back-up method for the electronic system should a system operator device not be functioning properly during a transaction. A user converts traditional transaction receipts to electronic form via a system device equipped for record conversion. As would be appreciated, the method of record conversion depends on the format of the original transaction receipt. For example, a paper receipt might be digitally imaged into a system device and/or scanned for optical character recognition (OCR). Other forms of receipt conversion might be as simple as a user presenting a smart card whereon the transaction information is stored and that transaction information is electronically transferred and/or copied from the card to the system database and stored in association with the user record. A system device for performing receipt conversion might be a kiosk equipped with a digital scanner and a biometric scanner. In the case of a paper transaction receipt conversion, the user would present the paper transaction receipt into the kiosk's digital scanner for scanning and/or information retrieval. The user would also present his biometric at the kiosk biometric scanner. The kiosk would retrieve the transaction information from the paper transaction receipt and send the transaction information and user biometric sample to the system database, where the information is stored with the user system record. If the user is not registered with the system, the database forms a new user record with which the user biometric sample and transaction information is stored. Additionally, receipt information a user presents may also include a code which identifies another location where supplemental transaction, operator, or user information is stored. With this code, the system may pull any supplemental transaction information not identified on the material a user has presented. For example, a paper transaction receipt may include a code pointing to where purchaser credit card information is stored in a merchant database.

In an additional embodiment of creating an electronic record within the system, user biometric information is matched at the transaction station. In such a method, a user enters his SID, which is used to locate the user's registered biometric sample. The user's registered biometric sample is sent to the transaction station, where it is compared to the user biometric sample entered during the transaction. If the biometric samples match, the transaction proceeds. In such an embodiment, transaction information may be sent to the database with the user SID, and the bulk of the transaction may be pre-approved/pre-declined based upon system parameters, allowing the transaction to be completed with acknowledgement of matching biometric samples. Alternatively, the system may not send transaction information to the database with the user SID, and may only proceed with processing the transaction after the user biometric sample has been matched to a user registered sample.

Figure 3:
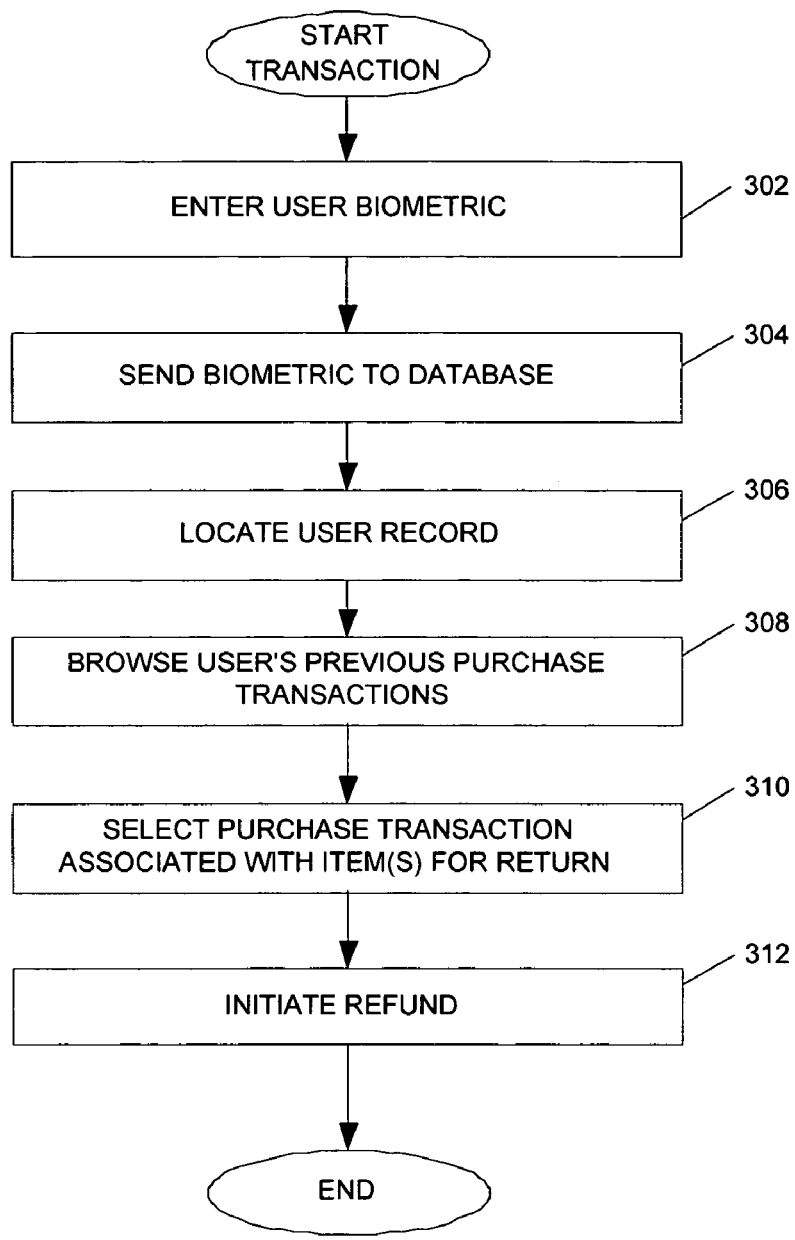
FIG. 3 illustrates a flowchart of a process for conducting a refund transaction with a biometrically associated, electronic transaction record.

Referring to FIG. 3, a flowchart of a process for an automated refund transaction is illustrated. At step 302, a system user biometric sample and a refund transaction request is entered. The refund transaction request may include but is not limited to one or more of requesting cash back for one or more returned items/services, requesting credit for one or more returned items/services, one or more product references indicating one or more products to be returned, and system operator information. For the purposes of this application, "cash back" refers to a refund transaction in which the user requesting the refund seeks a full reimbursement of money spent on the purchased item/service that they are requesting to return. Additionally, "credit" refers to credit a merchant typically provides a customer in place of cash back for products/services returned that may only be used at that specific merchant's or his affiliate merchants' stores. Depending on the embodiment of the system, product references may additionally be included in refund transaction requests. Such references include but are not limited to various specific product/service codes, such as universal product codes (UPCs), radio frequency identifiers (RFIDs), and infrared identifiers or various descriptive product/service references, such as product descriptors and department codes. The format in which the product code is disclosed might determine how the code is entered into the system. For example, if the code is a universal product code (UPC), which is typically printed on literature/packaging included with the product in numerical and bar code form, the code might be scanned and electronically entered. Likewise, a UPC might be hand keyed into the system by a system operator and/or user. Other formats of product code information include radio frequency identifiers (RFIDs), infrared transmitters, and/or any other form of electronic code identifiers.

At step 304, the user biometric sample and refund transaction request are sent to a database. In an additional embodiment, the system is configured for biometric verification and might request a user also enters a SID. In a biometric verification embodiment, the SID may serve as a pointer for locating the user record within the database, may indicate that the user is affiliated with a group of users, and/or may also indicate that the user seeking a refund transaction is not the purchaser of the item/service being returned but is affiliated with the purchaser in the system. Such an embodiment allows users to conduct return transactions for items/services purchased by affiliated users, such as gifts received from affiliated users or items purchased by affiliated business associates. In such an embodiment, all user records associated with the group SID entered are scanned for information that might pertain to return transaction request information.

At step 306, a user record is located at the database. At step 308, user transaction information associated with the user record is located. Depending on the product/service information provided in the refund transaction request, transaction information may be located in a number of ways. For example, if a product UPC was entered in the refund transaction request, product UPCs of the items purchased by the user are scanned until a match for the presented UPC is found. Alternatively, if more generic purchase item information is included in the refund transaction request, the system locates all items purchased relating to that information. This information is then presented to the system operator and/or the user so that the desired return information may be selected. At step 310, the refund transaction is initiated.

In an additional embodiment, one or more refund transaction request parameters must be met before the refund is initiated. For example, the system might comprise a system operator supervising the transaction to evaluate the condition of a returned item to ensure that the item was not used/abused and then presented for return. The system might also request that the system operator record the condition of the item via hand-keyed description, digital imaging, or a similar method of capturing item condition. In yet an additional embodiment, the user record pertaining to the returned item is marked returned to indicate that the user has already received a refund for that item.

In an additional biometric verification embodiment, refund request information, a user biometric sample, and a user SID are entered into the transaction station. The user SID is sent to a system database, and the user record and associated registered biometric sample are located. The registered biometric sample is sent to the transaction station, where it is compared to the user biometric sample. In embodiments in which group SIDs are implemented, all registered biometric samples associated with the group SID are returned to the transaction station. If the user biometric sample matches a registered biometric sample returned to the transaction station, refund request information is sent to the database, where it is either evaluated and approved or where it is used to retrieve transaction information relating to the refund request that is sent back to the transaction station so the appropriate transaction information may be designated and/or verified. In yet an additional embodiment, refund request information might be sent to the database upon initial transmission, along with the user/group SID. In such an embodiment, the refund request might be pre-approved, pending biometric matching, or transaction information stored in association with the user record and relative to the refund request might be returned to the transaction station so the appropriate transaction information may be designated and/or verified.

In an alternate embodiment, the system biometric matching parameters may be relaxed in an effort to reduce the value threshold, meaning less biometric information is used for matching therefore more biometric matches may occur. Typically, reducing the value threshold in turn increases the number of false positives a biometric matching session will return. By default, if a system can increase its number of false positives it in turn decreases its number of false negatives. The value threshold is reduced in an effort to create a larger amount of potential matches. Such a system would help ensure a more reliable consistency in pulling the matching user record on the first database scan. In a similar embodiment where a user enters a SID, the user SID may be truncated in an effort to return multiple potential biometric and transaction matching possibilities.

In an additional embodiment, users who receive a gift they would like to return may do so via the system by identifying the gift purchaser by providing purchaser information, such as a phone number. This information can then be used to retrieve the transaction record for the item the presenting user wishes to return. Record of such a return transaction would then be stored in the purchaser's and the presenting user's system record.

System operators who conduct biometrically initiated refund transactions might also want a method for encouraging customers who are not system users but who are seeking a refund to enroll in the system. In order to do so, system operators might implement a method of conducting receiptless refunds in conjunction with enrollment methods. A receiptless refund is a refund transaction request in which a customer seeks a refund for a transaction for which they have no transaction record to present. Such a user may not be enrolled in the system or may not have used the system during the specific transaction involved in the refund request. Should the customer not be enrolled in the system, the merchant might require the customer to enroll in the system by presenting at least a biometric sample. Depending on the embodiment of the system, the customer might present additional information such as but not limited to his name, address, telephone number, driver's license number and state of issue, financial account information, a SID, and any other identity information typically entered in a receiptless refund transaction. These types of transactions might provide system operators with some security in providing receiptless refunds because they provide merchants with at least biometric information. System operators desiring additional security might also associate system parameters with such transactions. For example, a system operator might only allow a customer to perform two receiptless refunds at that merchant's store over a specified period of time. Additionally, a system operator might not wish to provide a customer seeking a receiptless refund with a complete refund for the item they are returning and might set a system parameter in which the customer only receives a percentage of the requested refund for the returned item. Additionally, some system operators might wish to only extend store credit to users requesting receiptless refunds. In such a transaction, the system might additionally be configured to refund a user's money by associating a stored value account with the user that the user may use via biometric authentication.

Users may additionally access their system records for maintenance and user services such as refund request pre-approvals. Users may access their records by presenting a biometric sample and/or a SID. Access may be provided at a number of devices, including user personal devices, such as a personal computer 132, a telephone 128, and a user wireless device 136, 140, 144. Users may access their system records to track their transactions, update their user information, customize their user record, and/or request a refund transaction pre-approval. An example of how a user might track his transactions would be his provision of transaction codes to label and organize his electronic transaction records within the system according to the purpose of the transaction. For example, if the user is making a business related purchase, he might mark the transaction with a business code, or if the user is making a leisure related purchase, he might mark the transaction with a leisure code. Such a system may allow users to sub-divide their transactions according to these user-set transaction codes. Additionally, a user may request a refund transaction pre-approval by accessing his transaction records, locating the record(s) pertaining to his desired return transaction, and marking the record(s) with a request for refund. Once the system has pre-approved the refund transaction, the user need only return to the store or a refund kiosk, where he deposits the item(s) and where his refund request is approved. Such a method allows users and system operators to save time in completing return transactions.

In an additional embodiment, information transferred between two points in the system is encrypted. For purposes of example and without limitation, information may be encrypted at one point and sent across a non-secure connection between the points or not encrypted at a point of communication and sent to the other point of communication across a secure connection. Various methods of encryption and decryption may be used, and the embodiment should not be limited to one type of encryption. For example, the system may incorporate one or more methods such as SSL encryption, methods used by companies such as Verisign, PIN encryption typically used in a Point of Sale debit transaction, and/or any other similar method of encryption. As an added level of security, one alternate embodiment encrypts information internal to a terminal and which is never transmitted in a communication. This prevents retrieval of sensitive information (e.g., data corresponding to a biometric scan) from a stolen terminal. In an additional embodiment, the system incorporates one or more anti-tampering methods by which to recognize authentic and non-authentic system requests.

It is also an alternate embodiment of the present invention to provide operators with system user and other operator profile reports in case of suspected fraudulent activity within the system. These reports may be customized to display selected information from a system user's or system operator's record.

In an additional embodiment, user system access may be revoked. If for example the user has displayed negative system behavior, a user's usage might be revoked by deleting the user's system record from the database, marking a user's system record as in bad standing with one or more system operators, or marking the user's record as in bad standing with the network and/or one or more system operators and designating a period of time for which the record will remain bad. This period of time might be relative to an action that must be performed by the user with the record marked in bad standing.

A system and method for conducting electronic refund transactions in a biometric identification/verification system has been illustrated. It will be appreciated by those skilled in the art that the system and method of the present invention can be used to perform more convenient and more secure refund transactions than those offered by traditional methods of refund transactions. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above the invention is capable of other embodiments and of being practiced and carried out in various ways that would be apparent to one of ordinary skill in the art after reading the disclosed invention, and therefore the above description should not be considered to be exclusive of these other embodiments. Also, it is to be understood that the phraseology and terminology employed herein are for the purposes of description and should not be regarded as limiting.

What is claimed is:

1. A method for enabling a receiptless refund transaction using an electronic transaction receipt, the method comprising:
   a. receiving, at a transaction station, first biometric data from a user;
   b. receiving, at the transaction station, transaction information for a transaction item;
   c. storing said transaction information as an electronic transaction receipt, said storing being based on a match of said first biometric data and second biometric data previously registered in a database by said user;
   d. receiving a request for a refund for said transaction item, said received request including third biometric data;
   e. determining whether said third biometric data matches one of a plurality of authorizing biometric data in said database, wherein said plurality of authorizing biometric data represents registered biometric data for one or more users that are authorized to receive a refund for said transaction item; and
   f. authorizing said refund request upon retrieval of said stored electronic transaction receipt, wherein said stored electronic transaction receipt is retrievable if said third biometric data matches one of said plurality of authorizing biometric data, said refund transaction being completed using said electronic transaction receipt in place of a paper receipt.

2. The method of claim 1, wherein said transaction information includes product code information.

3. The method of claim 2, wherein said product code information is a universal product code information.

4. The method of claim 2, wherein said product code information is one or more of a radio frequency identification signal, a product keyword, and a product department code.

5. The method of claim 1, wherein said transaction information includes one or more of a transaction date, a transaction time, the location of a point of sale, payment information for the transaction, and the price of one or more items purchased in the transaction.

6. The method of claim 1, wherein said transaction information includes a system operator identifier.

7. The method of claim 6, wherein said system operator identifier includes one or more of biometric data, a password, an identification code, and a device code associated with a device registered to the system operator.

8. The method of claim 6, further comprising locating a user sub record associated with a specific system operator.

9. The method of claim 8, further comprising creating a user sub record if a sub record associated with a specific system operator is not located.

10. The method of claim 8, further comprising storing one or more transaction station parameters in association with said sub-record.

11. The method of claim 1, further comprising receiving an identification code.

12. The method of claim 11, wherein said identification code is a user system identification code.

13. The method of claim 11, wherein said identification code points to a group of one or more associated user records.

14. The method of claim 13, wherein said user records are associated according to one or more of a business relationship, a familial relationship, and an acquaintance relationship.

15. The method of claim 1, wherein said transaction station is at a point of sale.

16. The method of claim 1, wherein the transaction station receives transaction information via one or more of a digital scan of a paper transaction receipt; an optical character recognition scan of a paper receipt; a bar code scan of a paper transaction receipt; a radio frequency identification device transmitter receipt; and a two dimensional bar code scan of a paper transaction receipt.

17. The method of claim 16, further comprising:
   a. sending a request for additional transaction information to a second database;
   b. receiving, from the second database, said requested additional transaction information; and
   c. storing said additional transaction information in association with a user record.

18. The method of claim 17, wherein said additional transaction information includes one or more of further transaction payment information, further item detail, and further user information.

19. The method of claim 1, further comprising sending, by the transaction station, a transaction approval request.

20. The method of claim 19, wherein said transaction approval request includes a request for authorization of a financial transaction via a biometric authorization system.

21. The method of claim 19, wherein said transaction approval request includes a request for authorization of an age-restricted transaction via a biometric authorization system.

22. The method of claim 19, wherein said transaction approval request includes a request for authorization of an identity verification transaction via a biometric authorization system.

23. The method of claim 1, wherein said determining occurs at said database.

24. The method of claim 1, wherein said determining occurs at said transaction station.

25. A method in a transaction station for creating an electronic transaction receipt, the method comprising:
   a. receiving first user biometric data from a user;
   b. receiving a user personal identification code;
   c. sending said user personal identification code to a database;

d. receiving from said database second biometric data registered by said user that is stored in association with a user record identified by said user personal identification code;

e. comparing said second biometric data with said first biometric data; and f. if said comparison indicates a match, storing information related to a financial transaction as an electronic transaction receipt, wherein said electronic transaction receipt is retrievable in a subsequent refund transaction upon a determination that third biometric data presented by a user, matches one of a plurality of authorizing biometric data in said database, wherein said plurality of authorizing biometric data represents registered biometric data for one or more users that are authorized to receive a refund, wherein said electronic transaction receipt is used as proof of said financial transaction.

26. The method of claim 25, wherein said storing occurs automatically in accordance with system operator preferences.

27. The method of claim 25, further comprising sending a purchase transaction approval request that includes information related to said financial transaction.

28. The method of claim 25, wherein said plurality of authorizing biometric data is identified by an identification code.

29. A method for processing a refund transaction for one or more transaction items, wherein transaction information for the one or more transaction items is stored as an electronic transaction receipt in a database, the method comprising:

a. receiving a refund transaction request, said refund transaction request including at least a user biometric sample;

b. determining whether said user biometric sample matches biometric data in an identified set of authorizing biometric data in the database, wherein said identified set of authorizing biometric data represents registered biometric data for one or more users that are authorized to receive a refund for the one or more transaction items;

c. initiating a refund transaction based on the previously stored electronic transaction receipt if said user biometric sample matches biometric data in said identified set of authorizing biometric data; and d. storing, in the database, refund transaction information reflecting completion of said refund transaction.

30. The method of claim 29, wherein said refund transaction request includes an item code identifying an item to be returned for credit.

31. The method of claim 29, wherein said refund transaction request includes a plurality of item codes identifying a plurality of items to be returned for credit.

32. The method of claim 29, wherein said refund transaction request includes information related to the condition of one or more returned items.

33. The method of claim 29, wherein said authorizing comprises evaluation said refund transaction request according to refund transaction parameters.

34. The method of claim 33, wherein said refund transaction parameters include one or more of the number of days since the date of the purchase transaction and the amount of the refund request.

35. The method of claim 34, wherein if said refund transaction request does not meet said refund transaction parameters, a stored value account is associated with a user record.

36. The method of claim 35, wherein said refund transaction request is granted by means of crediting said stored value account.

37. The method of claim 36, wherein said user authorizes use of the credit held in said stored value account for conducting financial transactions via biometric authorization.

38. The method of claim 29, wherein the refund transaction request information includes information identifying a system operator supervising the refund transaction.

39. The method of claim 38, wherein said refund transaction request is processed via financial account information stored in association with a system operator record.

40. The method of claim 38, wherein the system operator identifying information includes one or more of a system operator password, a system operator identification code, and the device identification code of a system device associated with the system operator.

41. The method of claim 38, wherein the system operator information is a biometric sample.

42. The method of claim 41, wherein the system operator biometric sample is matched with a system operator biometric sample stored in the database.

43. The method of claim 29, wherein said refund transaction is processed via financial account information stored in association with a user record.

44. The method of claim 29, further comprising notifying said user via electronic communication when the refund transaction has been fully processed.

45. The method of claim 29, wherein said determining occurs at the database.

46. The method of claim 29, wherein said determining occurs at a transaction station.

47. The method of claim 29, wherein said identified set of authorizing biometric data is identified by an identification code.

* * * * *